(12) United States Patent
Medley et al.

(10) Patent No.: US 7,115,873 B2
(45) Date of Patent: Oct. 3, 2006

(54) COMPOUND OPTICAL COUPLER AND SUPPORT MECHANISM

(75) Inventors: Dwight Medley, Fayetteville, TN (US); Dean Estill, Huntsville, AL (US)

(73) Assignee: Frederick Mining Controls LLP, Huntsville, AL (US)

(*) Notice: Subject to any disclaimer, the term of this patent is extended or adjusted under 35 U.S.C. 154(b) by 0 days.

(21) Appl. No.: 10/911,485

(22) Filed: Aug. 5, 2004

(65) Prior Publication Data

US 2006/0027753 A1 Feb. 9, 2006

(51) Int. Cl.
*G01T 1/20* (2006.01)
(52) U.S. Cl. .................................. 250/361 R
(58) Field of Classification Search ............ 250/361 R, 250/239, 214.1, 368
See application file for complete search history.

(56) References Cited

U.S. PATENT DOCUMENTS

| | | | | |
|---|---|---|---|---|
| 5,070,249 A | * | 12/1991 | White | 250/483.1 |
| 6,375,574 B1 | * | 4/2002 | Young et al. | 464/68 |
| 6,452,163 B1 | * | 9/2002 | Frederick et al. | 250/239 |
| 2003/0122082 A1 | * | 7/2003 | Frederick et al. | 250/361 R |

* cited by examiner

*Primary Examiner*—David Porta
*Assistant Examiner*—Marcus Taningco
(74) *Attorney, Agent, or Firm*—Dickstein Shapiro LLP

(57) ABSTRACT

A support mechanism for protecting an object is described. The support system includes at least one support ring for providing dynamic protection to the object. One embodiment includes a support ring having corrugated bumps. Another embodiment includes multiple support rings axially separated by spacers. A compound optical coupler is also described, which has a self-wetting clear optical coupling gel and an elastomeric load ring.

18 Claims, 9 Drawing Sheets

COMPOUND OPTICAL COUPLER AND SUPPORT MECHANISM

BACKGROUND

The invention generally relates to a protective mechanism and an optical coupler for use in systems for detecting the presence of hydrocarbons during mining or drilling operations. In the prior art, special optical couplers using Sylgard along with optical coupling oil have been employed with prior support systems to couple light from a scintillation element into a light detector device. Such an optical coupler is disclosed in U.S. Pat. No. 6,465,788, which is incorporated herein by reference in its entirety. One drawback to this approach is that, under some extreme cases of high loads, uneven loads, or high vibration, oil used in the optical coupling may migrate out over time and result in degraded detector performance. Another drawback is that precision fabrication and/or assembly tolerances must be maintained to prevent loss of oil and degraded performance. Yet another drawback is that particulate contamination of the optical coupler can also cause loss of oil and degraded performance.

Optical couplers made from self-wetting type materials (e.g., Wacker) have also been used. A drawback to these concepts is that the self-wetting materials exhibit viscous behavior and tend to flow outward from the optical interface, allowing the optical interface retaining force to be lost, and thus resulting in degraded performance.

Nuclear detectors, such as gamma detectors, have been used in mining applications and oil drilling operations for many years. In particular, gamma detectors have been used to measure the radiation that emanates from the formations surrounding the mining or drilling equipment. Such gamma detectors operate by utilizing the differences between the natural radioactivity of the target formation and the natural radioactivity of the adjacent formations to determine the boundaries between these formations.

Gamma detectors are sensitive and must be protected from harsh environments to survive and to produce accurate, noise free signals. This protection must include protection from physical shock and stress, including force, vibration, and abrasion, encountered during solid mineral mining and oil drilling operations. However, the closer in proximity the gamma detector is to the mineral being mined or drilled, the greater is the shock, vibration and stress to which the detector is subjected.

The presence of armor, which is required to protect the detector, further limits the available space. An explosion-proof housing takes up even more of the available space, and often results in reducing the diameter of the photomultiplier tube. When light detecting devices of relatively low mass density are used in connection with scintillation elements having a relatively high mass density, a specials means of support is needed to reduce rotation moments when under high vibration or high shock. Lower cost for providing protection for the detector is also needed.

A support system must be very effective in protecting the detector from the harsh vibrations and shock, but must also do so while consuming a small amount of space. Similarly, in mining operations, the outer portions of the detector and the armor must provide a high level of shielding from unwanted radiation and must protect the detector from impact and abrasion, all with a minimal use of space.

In the prior art, detectors have been protected by a plurality of springs which extended along the axial length of the detector or its scintillation element. An example of such a support system is a flexible dynamic housing, as disclosed in U.S. Pat. No. 6,452,163, which is incorporated by reference herein in its entirety. One drawback of such systems is that the springs extend along the axial length of the scintillation element and as such can block radiation from reaching the scintillation element. Another drawback is that such a mechanism uses a plurality of parts around the circumference of the detector. Moreover, the springs of the flexible housing have to be custom made for this specific industrial application. Also the annular gap that exists between the scintillation element and its rigid housing is not always uniform, such as because of dimensions of tolerance. This may complicate the installation or sizing of the system. Moreover, if the gap is not uniform, the dynamics of the system along the length may not be uniform or may be affected.

Another support mechanism for a detector is disclosed in pending application Ser. No. 10/270,148, which is incorporated herein by reference in its entirety. This type of support mechanism is a flexible support sleeve which extends along the length of the detector or scintillation element, and suffers from the same drawbacks discussed above with respect to the springs.

There remains a need for an optical coupling system that is less sensitive to fabrication/assembly tolerances, high/uneven loads, and high vibrations. There is also a need for a simplified, lower cost structure and method for supporting instrumentation packages and sensors, such as gamma detectors. A means for supporting sensitive elements, which have substantially a cylindrical shape, is needed to work in cooperation with other suitably chosen support elements. A more suitable method of supporting sensitive elements so as to produce less compression of optical reflecting material is also needed.

SUMMARY

The inventions provide a gamma detector which, in some aspects, may be utilized in oil well drilling and/or servicing operations, and solid mineral mining operations. In one aspect of the inventions, the gamma detector includes a scintillation element.

In one aspect, the invention provides a scintillation element package comprising a scintillation element; a housing encompassing the scintillation element; and a support mechanism including at least one support ring, the support mechanism being between the scintillation element and the housing.

In another aspect, the invention provides a gamma detector comprising: a photomultiplier tube; a first housing surrounding the photomultiplier tube; and a support mechanism including at least one support ring supporting the photomultiplier tube.

In yet another aspect, the invention provides a support mechanism comprising: a rigid housing and a support mechanism having a support ring, wherein the support mechanism at least partially surrounds an object to be protected, and wherein the support mechanism is between the rigid housing and the object.

In still another aspect, the invention provides a detector comprising: a scintillation element; a first housing and a second housing; an inner support mechanism including at least one support ring, said inner support mechanism supporting the scintillation element; an outer support mechanism including at least one support ring, said outer support mechanism supporting the scintillation element and surrounding said inner support system.

In another aspect, the invention provides a compound optical coupling assembly comprising a self-wetting optical coupling gel in an interior portion of the optical coupling assembly, and an elastomeric load ring radially outward of the self wetting optical coupling gel.

This invention provides a low cost method of supporting instrumentation systems and/or subsystems within mining equipment, or other equipment used in harsh environments. The invention provides a scintillation element package that includes a scintillation element, a shield encompassing the scintillation element, and a support mechanism having a support ring at least partially surrounding the scintillation element within the shield, the support mechanism providing support for the scintillation element.

The invention also provides, in one aspect, a support mechanism that includes a support ring surrounding and protecting an object to be protected, wherein the support mechanism provides support for the object. In another aspect, the invention provides a support mechanism having a support ring including an inner support mechanism surrounding and protecting an object to be protected and an outer support mechanism surrounding the inner support mechanism, the outer support mechanism fitting within a cavity.

DETAILED DESCRIPTION OF PREFERRED EMBODIMENTS

Figure 1:
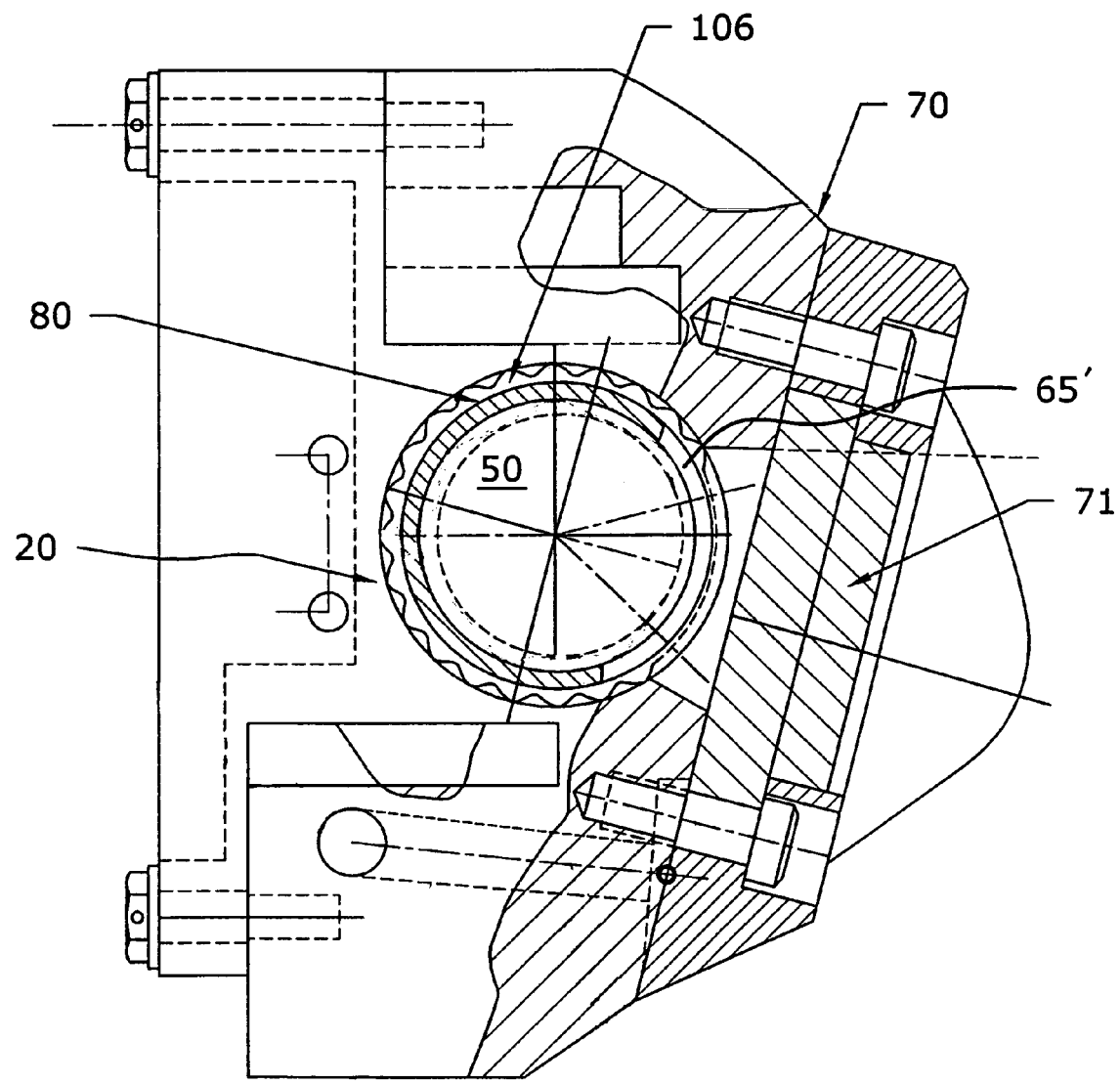
FIG. 1 is a cross-sectional view of an armored housing for solid mineral mining use having a gamma detector support mechanism constructed in accordance with an embodiment of the invention.
Figure 2:
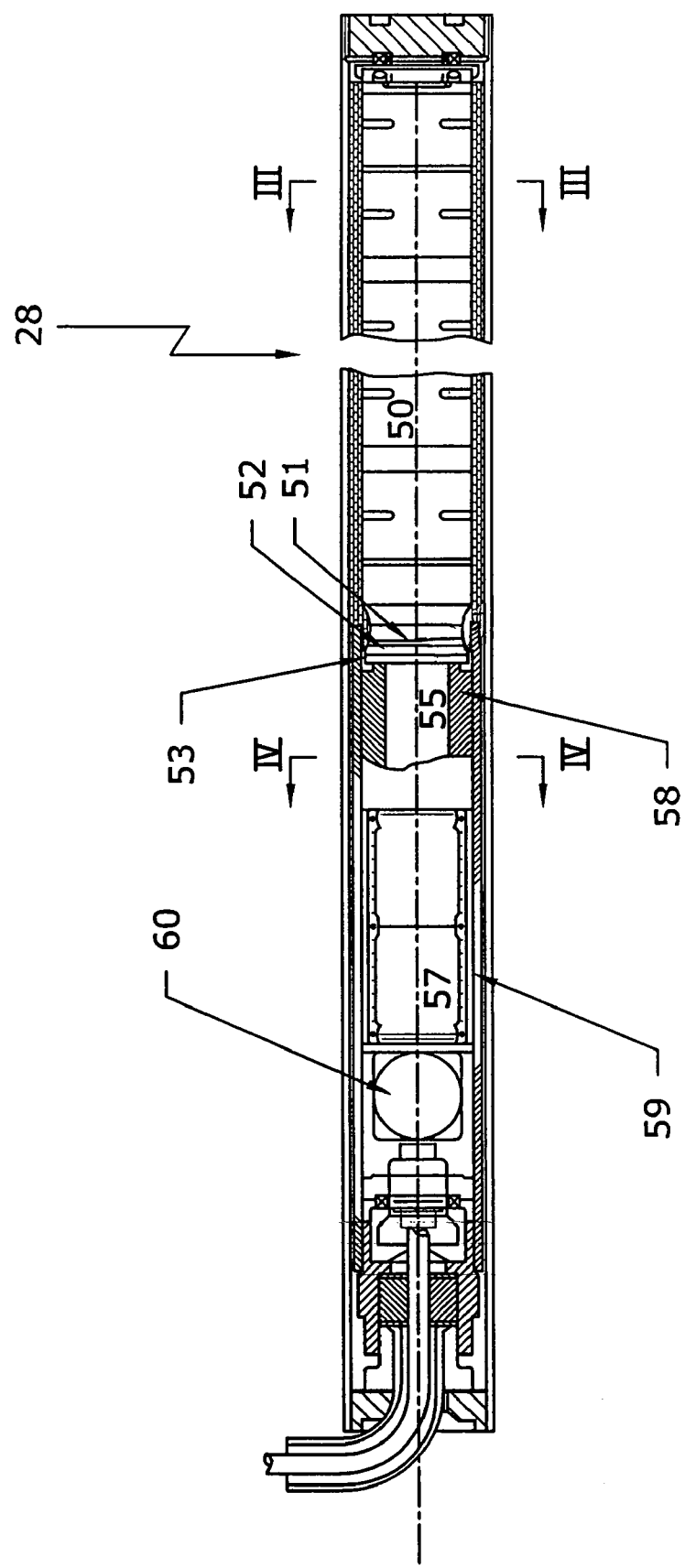
FIG. 2 is a cross-sectional view along the length of the gamma detector of FIG. 1.
Figure 3:
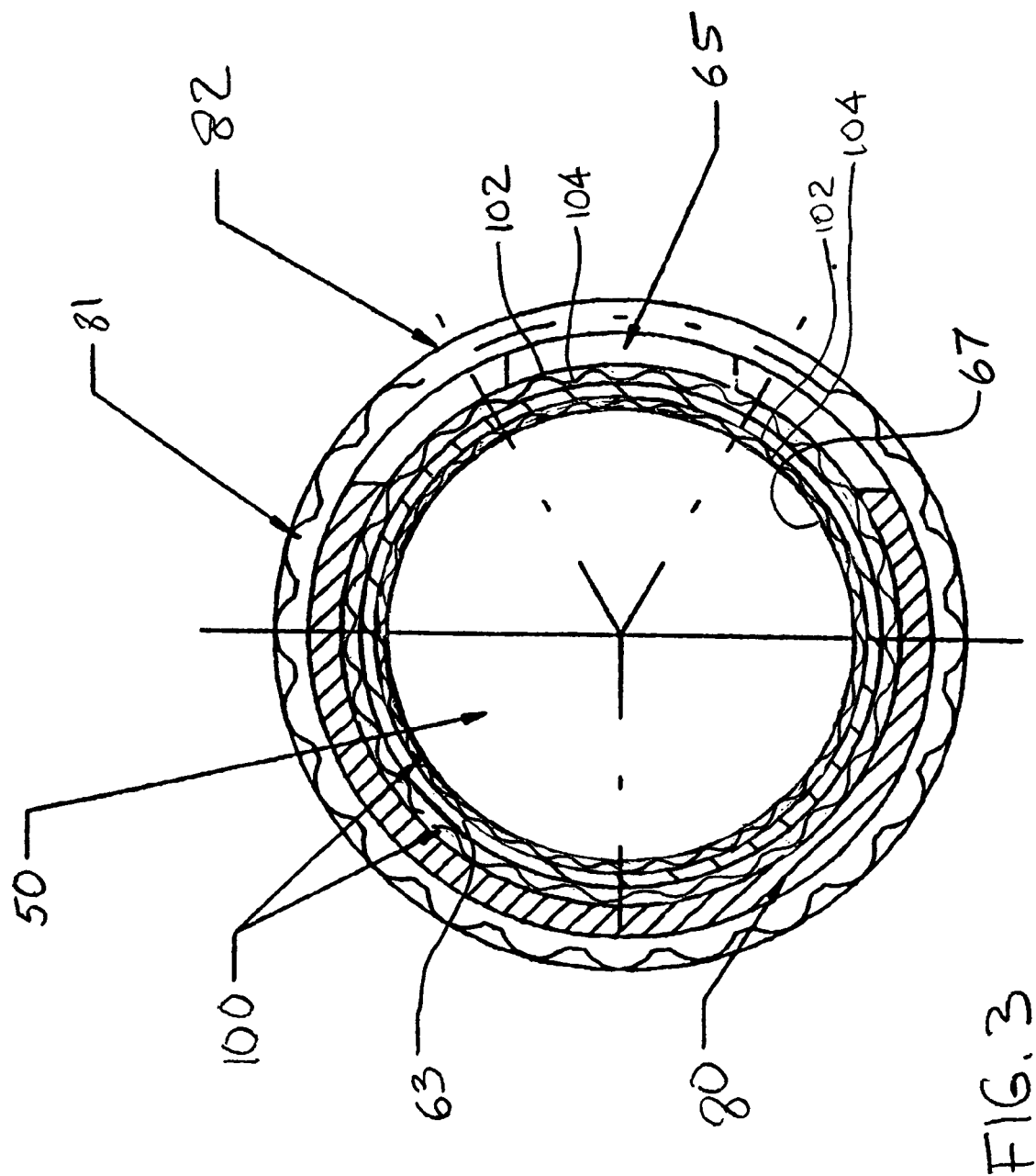
FIG. 3 is a cross-sectional view taken along line III—III of FIG. 2.
Figure 4:
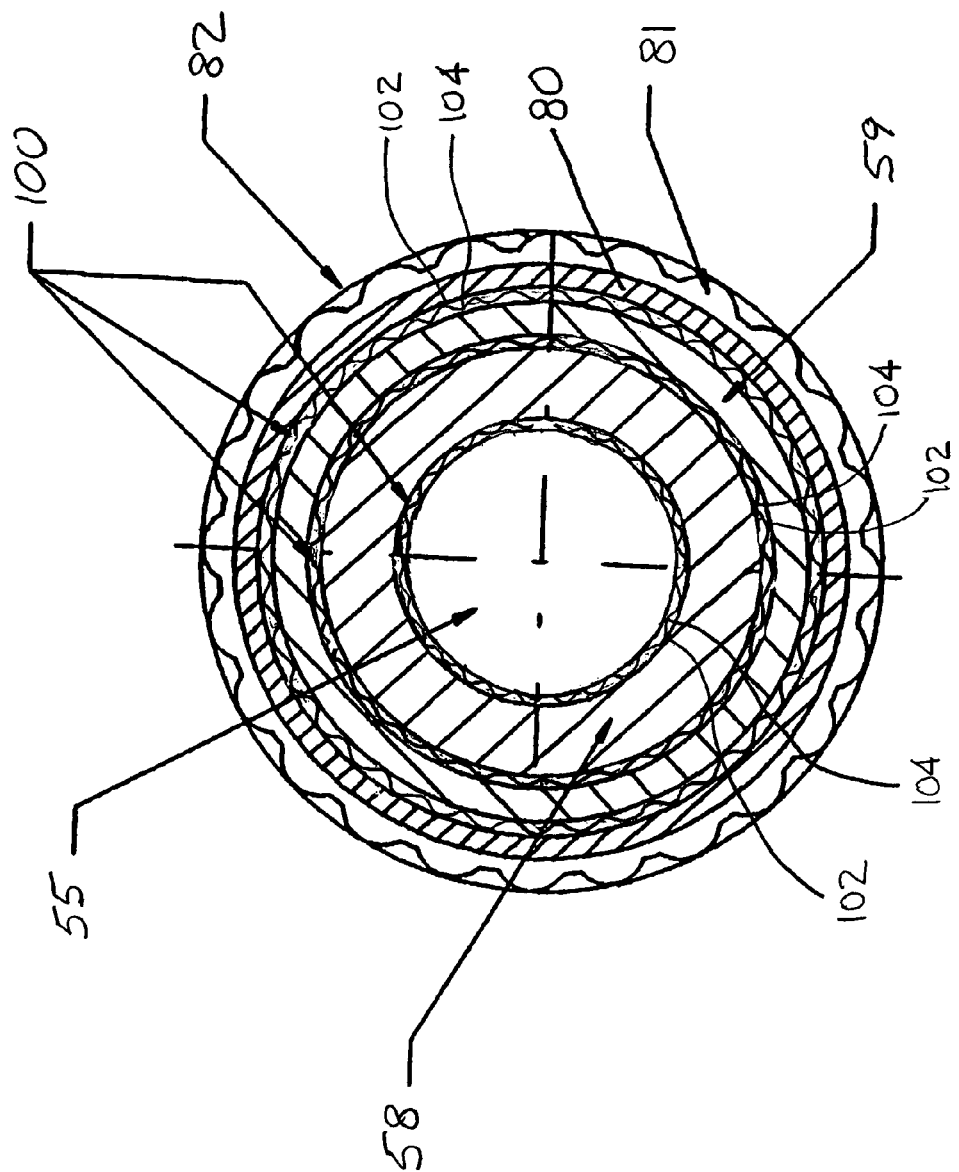
FIG. 4 is a cross-sectional view taken along line IV—IV of FIG. 2.

FIG. 1 illustrates a gamma detector 20 installed into armor 70 for mounting a mining module for use in solid mineral mining operations. As shown in FIG. 1, the detector 20 is protected by armor 70 that surrounds, shields, and supports the detector. The detector 20 also may be used in conjunction with oilfield operations, without the armor 70. FIG. 2 shows a cross-sectional view of the gamma detector 20. FIGS. 3 and 4, which are cross-sectional views of FIG. 2, show the various components that protect the scintillation element 50, the electronics 57 and other sensors. These multiple levels of protection are described in detail below.

With reference to FIGS. 1 and 2, gamma rays 28 entering the gamma detector 20 pass through a non-metallic window 71 to reach the scintillation element 50 within the detector 20. Other windows 65 (FIG. 3) have been cut into a rigid dynamic enclosure 80 which surrounds the scintillation element 50.

Next, with reference to FIG. 2, the general function of the detector 20 will be described. A scintillation element 50 responds to gamma rays 28 that have been emitted from rocks in the soil. The response of element 50 is to produce a tiny pulse of light that travels to a window 52 at the window end of the scintillation element 50 or is reflected into the window 52 by a reflector 67 (FIG. 3) that is wrapped around the scintillation element 50. The light pulse travels through a first optical coupler 51, through the window 52, and through a second optical coupler 53 into the faceplate of a light detecting element, shown here as a photo-multiplier tube 55. An electrical pulse is generated by the photo-multiplier tube 55 and sent to electronics element 57.

The photo-multiplier tube 55, the electronics element 57 and an accelerometer 60 are located in an assembly called a photo-metric module 58. Since components within the photo-metric module 58 utilize electricity, it is necessary that it be enclosed in an explosion-proof housing 59 to avoid accidental ignition of gas or dust that may be in the vicinity of the detector 20. Also, the explosion-proof housing 59 serves as an effective barrier that protects the electrical elements 57 and the accelerometer 60 from the strong electromagnetic fields generated by heavy electrical equipment.

Better details of the protective elements are shown in FIGS. 3 and 4. The first view in FIG. 3 shows a support mechanism 100 that surrounds the scintillation element 50, and protects it from high levels of lower frequency vibrations. The support mechanism 100 will be described in greater detail below. The support mechanism 100 between the scintillation element 50 and the scintillation shield 63 supports the fragile scintillation element 50 and provides a high resonant frequency so that it will not resonate with lower frequency vibrations that pass through the outer housing. The outer housing 82 encloses another support mechanism 100, the rigid enclosure 80 and a rigid elastomeric shock absorbing sheath 81 which surrounds the enclosure 80.

A typical size scintillation element 50 for this application is 1.4 inches in diameter by 10 inches in length, but may be as large as 2 inches in diameter. The resonant frequency of these outer support elements 81, 80 protect against shock and isolate the scintillation element 50 from high frequencies.

FIG. 4 illustrates a view of a photo-metric module including a photo-multiplier tube 55 inside a first housing 58, which is within the explosion-proof housing 59. The support mechanism 100 is located at three radial elevations about the photo-multiplier tube 55: between the photomultiplier tube 55 and the first housing 58; between the first housing 58 and the explosion-proof housing 59; and between the explosion-proof housing 59 and the rigid enclosure 80.

The elastomeric shock-absorbing sheath 81 fully covers the entire rigid dynamic enclosure 80. It should be noted that this sheath 81 serves other useful purposes. It provides good mechanical compliance with the armor 70. This is particularly important during installation in which dust and particles will be present. Another purpose of the sheath 81 is to prevent water or dust from entering through the window in the enclosure 80. The accelerometer module 60 is afforded the same critical protection from the harsh environment as the photo-multiplier tube 55.

In use, there is a need to firmly hold the light collecting element, which in this case is the photo-multiplier tube 55, so that it remains fixed in position relative to the window 52 through which the light is passing from the gamma detector scintillation element 50. This is especially important in the disclosed embodiment because the exemplary optical coupling between the photo-multiplier tube 55 and the window 52 is a two-piece compound coupling. One piece of the coupling is a soft, self-wetting pad typically made from a material called Wacker. Surrounding this inner coupling is a ring made from a more substantial material such as Sylgard, also pliable, optically transparent material. The self-wetting optical coupler of the invention will be discussed in greater detail below.

To work properly, the photo-multiplier tube 55 must not be free to move more than a few thousands of an inch in the radial direction, while at the same time, be pushed with a uniform force against the coupling elements and by a spring. To accomplish these dual requirements, the photo-multiplier tube 55 must be sufficiently free to move in the longitudinal direction while having its motion in the radial direction significantly restrained. Moreover, thermal expansion must not interfere with the two requirements discussed above.

Figure 5:
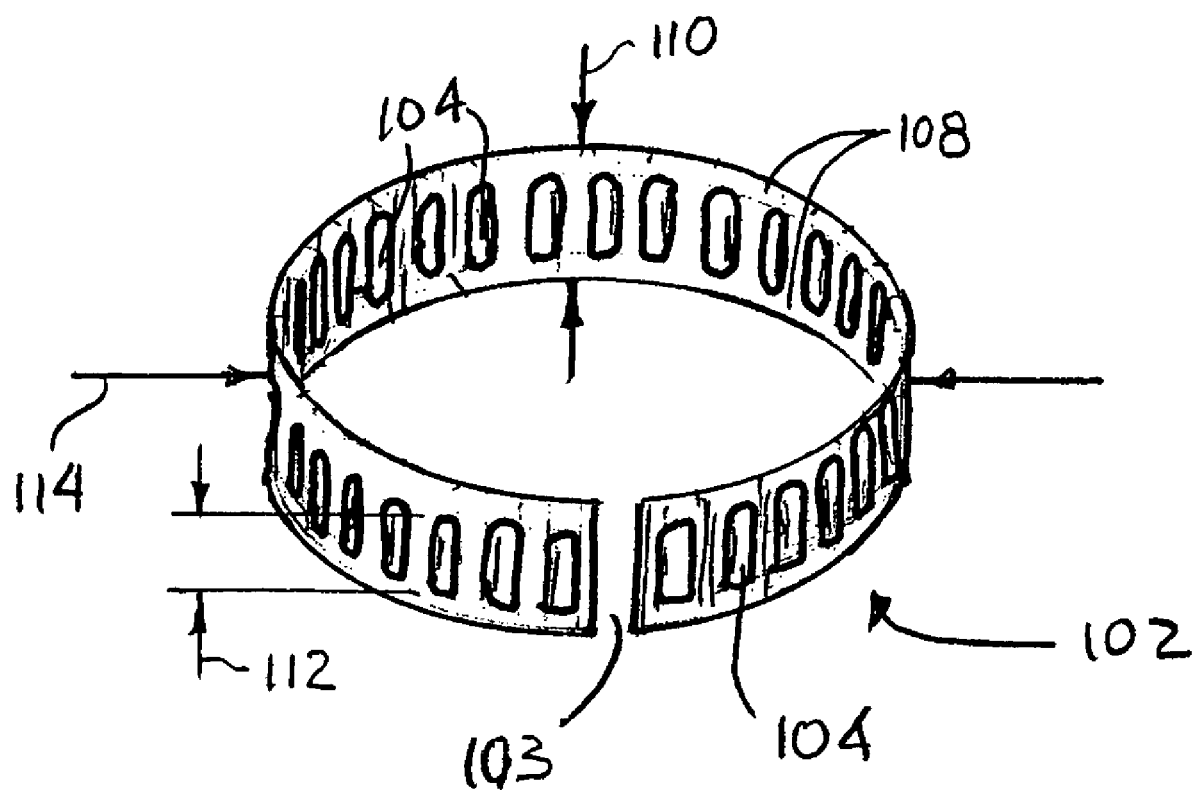
FIG. 5 is a perspective view of a support ring of the support mechanism of FIG. 1.

These requirements are accomplished by the support mechanism 100 of the present invention. The support mechanism 100 comprises support rings which are placed around the photo-multiplier tube 55. The support mechanism 100 will be described with reference to FIGS. 5 and 6. A main component of the support structure 100 is a support ring 102, an example of which is shown in FIG. 5. Such a support ring 102 is commonly referred to as a tolerance ring in several industrial applications. One manufacturer of such rings is USA Tolerance Rings in Pennington, N.J.

The tolerance, or support ring is a device that facilitates fitting of concentric cylindrical parts. The support ring 102 has corrugated bumps 104 which have a height 112. The support ring 102 also has a height 110 and a diameter 114, and may have a rim 108. In the example shown, the corrugated bumps extend, or face, toward the center of the support ring 102. The inward facing corrugated bumps 104 compress in proportion to torque or radial load for wider dimensional tolerance. The support ring 102 is not continuous, and has an opening 103. In use, the opening 103 allows the support ring 102 to flex to accommodate different diameters, to move and to absorb shock and to thermally expand. In a preferred embodiment, a support ring with a part number of ANL-R8-9-S from USA Tolerance Rings can be used. Such a support ring has a diameter 114 of approximately 1.125 inches, a height 110 of approximately 0.313 inches, and a bump height 112 of approximately 0.25 inches. However, the heights 110, 112 of the support ring 102 and bumps 104, and other parameters, may be varied to accommodate design parameters.

The support ring 100 is a frictional fastener, capable of handling direct torque transfer, torque slip, axial retention, controlled collapse and radial loading between mating cylindrical components. It is a corrugated metal strip that acts as an interface between two mechanical objects, to secure one to the other by interference fit. The corrugated bumps 104 deflect and allow the support ring 102 to act like an elastic shim.

Figure 6:
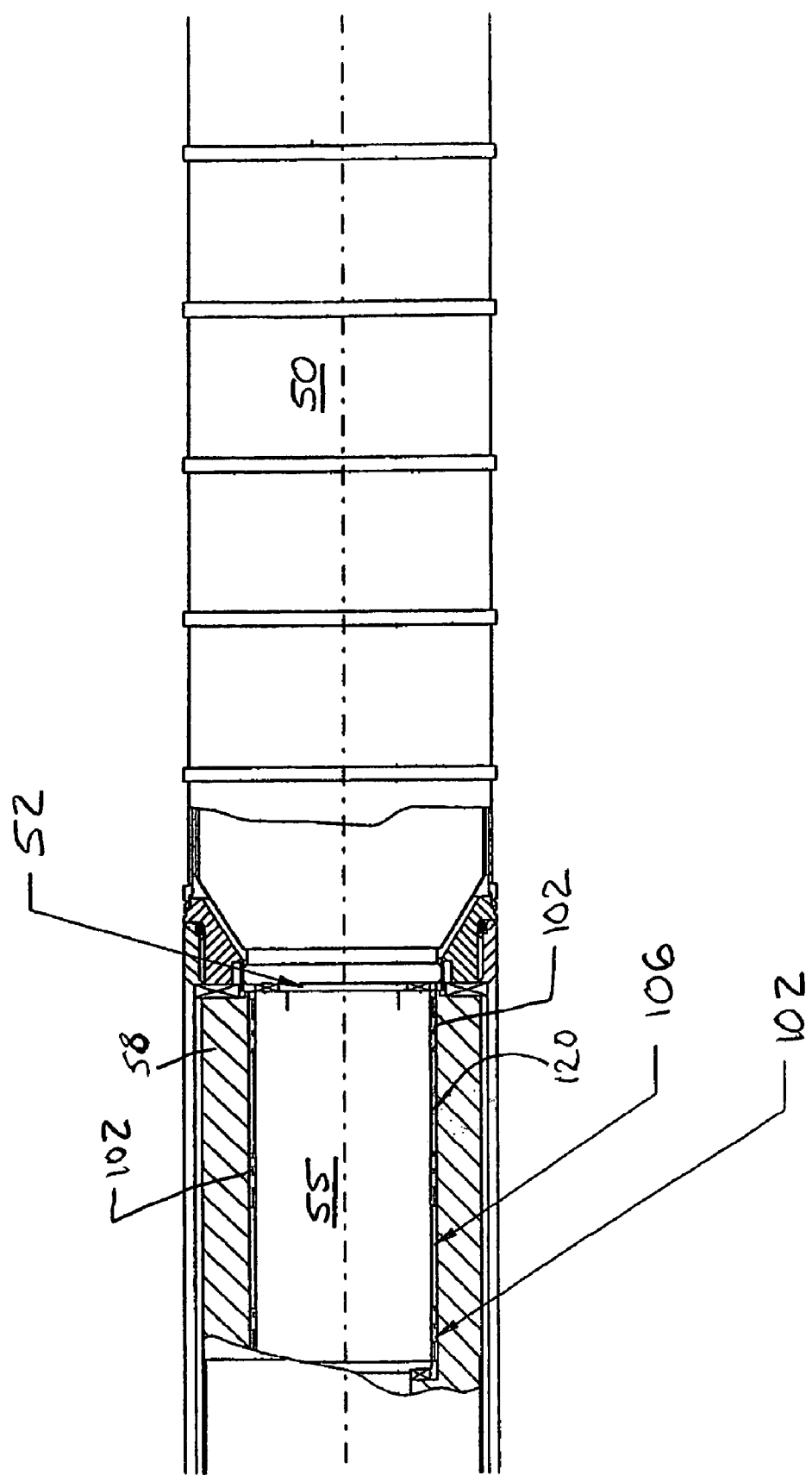
FIG. 6 is a cross-sectional view of a gamma detector having a support mechanism in accordance with an embodiment of the invention.

The number of the support rings 102 is chosen depending on the configuration of the photo-multiplier tube 55. In an exemplary embodiment, between two and five support rings are used. With reference to FIG. 6, three support rings 102 are shown supporting the photo-multiplier tube 55. The support rings 102 may be held in place by metal tape or a metal retainer, designated by numeral 106. The metal tape 106 has an adhesive material on its inward facing surface. The metal tape, or retainer 106, is installed about the housing 120 of the photo-multiplier tube 55. The metal tape or retainer 106 also functions as a spacer to laterally separate the support rings 102. The support rings 102 do not extend longitudinally along the photo-multiplier tube 55. Rather, the support rings 102 extend around the circumference of the photo-multiplier tube 55, and are spaced out in intervals along its length.

Figure 7:
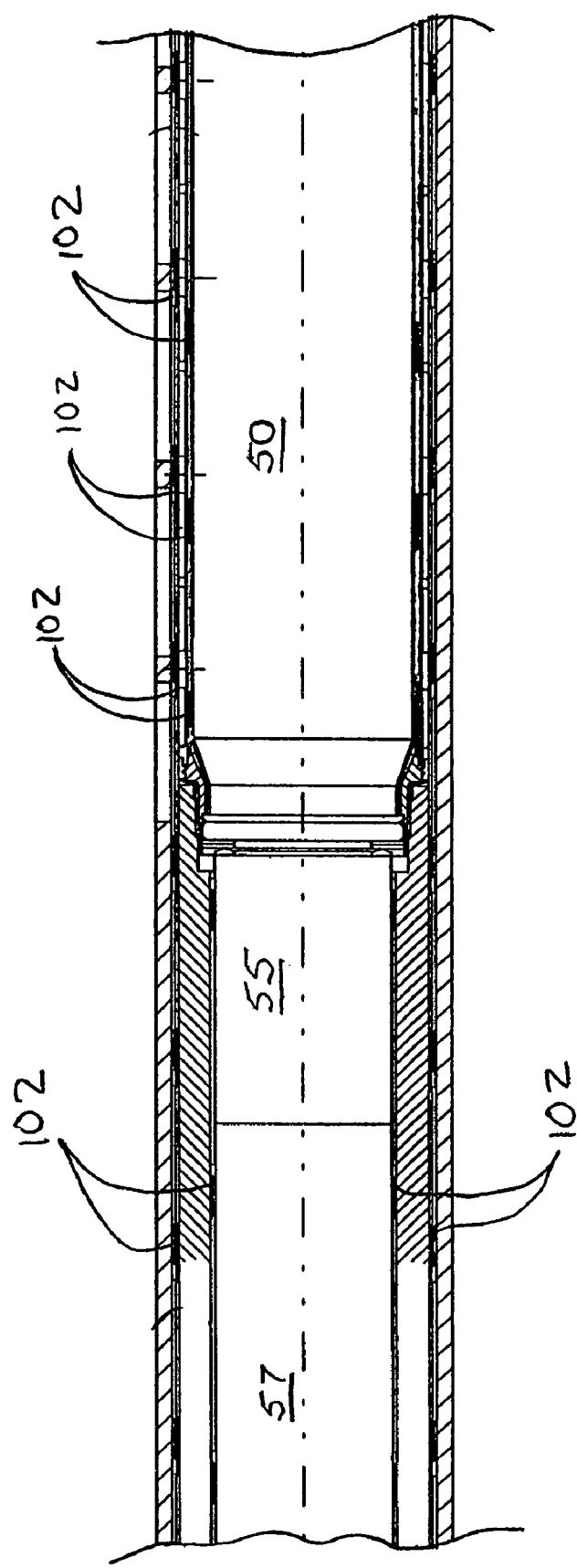
FIG. 7 is a cross-sectional view of a gamma detector having a support mechanism in accordance with an embodiment of the invention.
Figure 8:
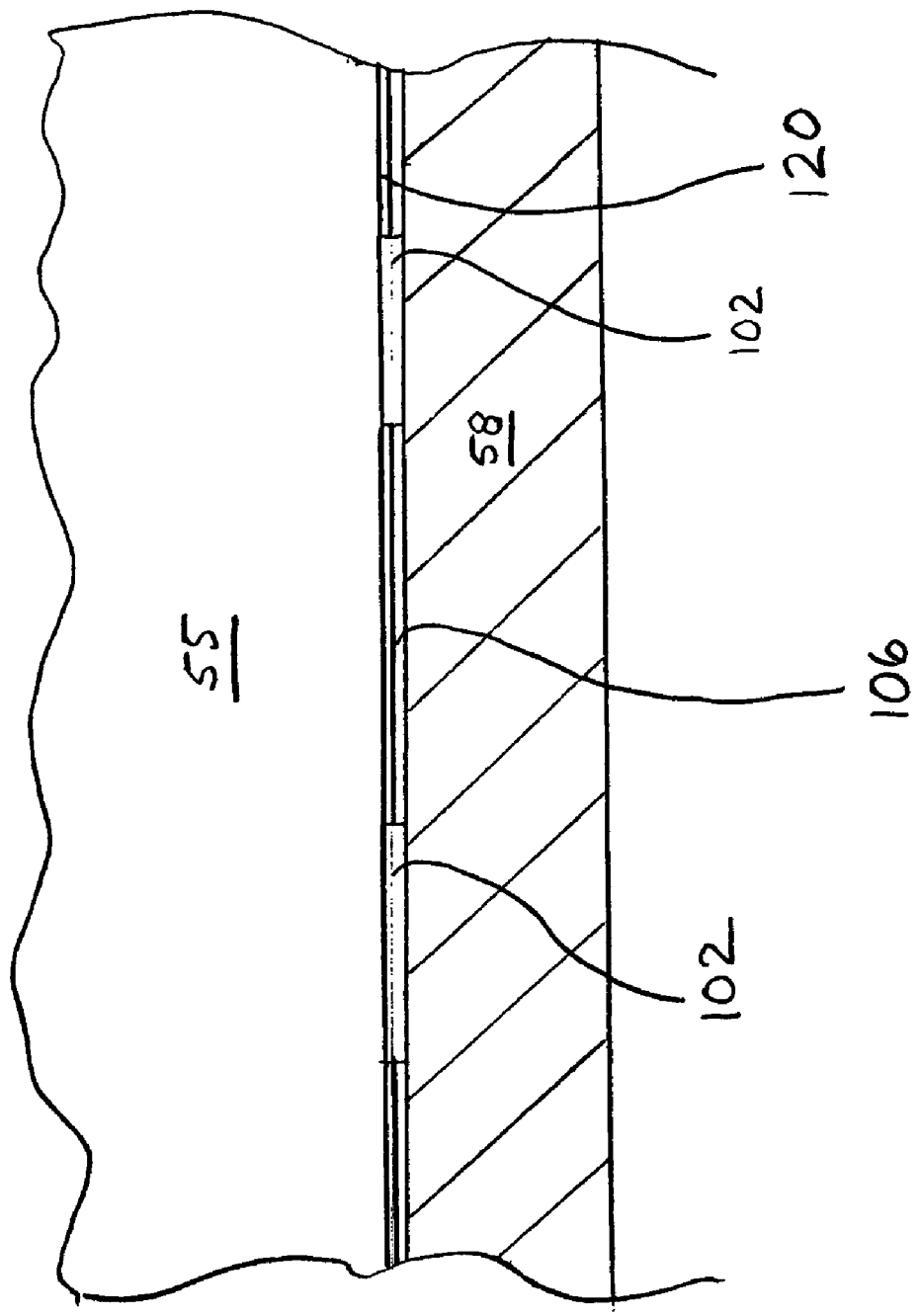
FIG. 8 is a close-up view of FIGS. 6 and 7.

FIG. 7 shows the scintillation element 50, photo-multiplier tube 55 and electrical elements 57 supported by the support mechanism 100. In FIG. 7, the support rings 102 are shown at different radial elevations with respect to the supported components 50, 55, 57. The support rings 102 at different radial elevations do not have to be concentric and can be spaced apart along the length of the protected elements 50, 55, 57. FIG. 8 shows a close-up view of the support mechanism 100. The support rings 102 are separated by the metal tape or retainer 106. The support rings 102 do not extend axially along the length of the photo-multiplier tube 55. Rather, the support rings 102 are spaced apart axially, and extend around the circumference of the photo-multiplier tube 55.

If the first housing 58, the tolerance rings 102 and the photo-multiplier tube housing 120 are of the same material, or material with equivalent thermal expansion coefficient, there will be very little differential expansion due to thermal changes. In applications where the vibration and shock are the most serious environmental challenges and thermal changes are not significant, the choice of materials may not be very significant. In applications such as down-hole drilling for oil and gas, careful attention must be paid to the selection of compatible materials to avoid significant thermal expansion.

It should be noted that in a preferred embodiment, the housing around the photo-multiplier tube 55 is rigidly connected to a crystal outer housing so that the crystal outer housing and the photo-multiplier tube 55 do not move relative to each other. Therefore, if the support rings 102 do not allow excessive motion in the radial direction of the photo-multiplier tube housing 120 relative to the first housing 58, then the photo-multiplier tube 55 would be held sufficiently well relative to the window 52 of the housing and crystal package combination.

If the support rings 102 are made from soft materials, such as elastomers, then they would tend to have a low resonant frequency and a relatively high dynamic transmissibility. This is known to have undesirable consequences. If the rings are made from a rigid material such as solid steel, then the tolerances of all the mating parts would have to be made extremely precise to prevent the elements from being loose, and they would have to be installed in a tight tolerance condition. Yet, if the support rings 102 are tight and rigid, then any errors in tolerances would render the support rings 102 difficult or impossible to install without damaging the delicate instruments. Some instruments for harsh environments are known to be designed in just this manner, and are known to be costly to manufacture. The solution is to use support rings 102 that are made from a strong material, such as stainless steel, but configured such that the support rings 102 have some elastic properties.

In order to conserve valuable space within the detector or other similar tool, the support rings 102 need to be very thin. In use, unique design parameters for the support rings 102 are selected to meet particular requirements of the application for which the support rings 102 are used. Some of the particular requirements are as follows.

The overall thickness of the support rings 102 is selected to fill gaps and tolerances between two components, and selection of appropriate tolerance rings is made using vendor catalog data. Friction forces exerted by the support rings 102 must be sufficient to prevent relative longitudinal motion between two components due to vibration forces, while the size of the support rings 102 must remain small enough to allow ease of assembly. Examples of nominal friction forces are 40 pounds-force for a 1 inch×4 inch detector, and 125 pounds-force for a 2 inch×10 inch detector. Support ring 102 data, provided by vendors, includes: Torque; Capacity; Diametral Clearance; material thickness; and corrugation pitch. These and other parameters are used to determine the appropriate support ring characteristics.

Another consideration when selecting a support ring 102 is protection in a high vibration environment. This is achieved by a natural vibration frequency of the combination of the component and support ring. The natural vibration frequency should not adversely couple with the vibration loads of the environment. Vibration environments that must be protected against are typically in the 100–200 Hz range. Thus, support rings 102 would typically be designed to provide a natural vibration frequency greater than 300 Hz. Stiffness of the support ring is the key parameter used to control the natural vibration frequency. Support ring vendor catalogs typically provide data used to determine support ring stiffness.

Still another consideration is to provide adequate structural support to components in order to prevent structural failure due to damaging acceleration loads. Multiple support rings 102 may be used along the length to provide support as needed to reduce mechanical stress. Traditional stress analysis techniques are used to determine where and how many support rings are needed.

Use of the support rings 102 in the present invention results in a desirable support mechanism 100. The support rings 102 can be selected and installed to provide resistance to movement in the longitudinal direction within acceptable limits while limiting the movement in the axial direction to a few thousands of an inch. Thus, the support system 100 comprising the support rings 102 protects optical coupling elements from excessive stress.

The present inventions offer several advantages, as follows. The inventions provide a lower cost method of supporting instrumentation packages and sensors using off-the-shelf commercial parts. The inventions provide a more convenient method of delivering stiff support to an undersized component fitted into a standard sized housing (i.e., filling of the gap and tolerance). Also, when two parts of a detector assembly (e.g., electronics and crystal elements) that have different diameters are assembled into a common housing, use of tolerance rings allows the parts to be assembled without using sleeves to increase the smaller diameter. Another desirable result is that a lesser amount of radiation is blocked from entering into the scintillation element.

Unlike flexible sleeves and flexible dynamic housings that must extend along the length of the scintillation element, the support mechanism 100 having support rings 102 supports only at two or more locations of the scintillation element. This is possible because of the relative high stiffness of the support ring 102 due to the curved shape of the bumps 104. If the support ring 102 has a rim 108, i.e., the bump 104 does not extend the full height 110 of the support ring 102, the ring will be even stiffer. This improves optical performance of the scintillation element. Since tolerance rings support only at locations of the scintillation element, this leaves a significant portion of the reflective tape along the length of the scintillation element not compressed, and uncompressed reflective tape has superior optical performance.

In addition, the support mechanism having support rings 102 works well where the annular gap between the photomultiplier tube and its rigid housing is not uniform. Because the support rings do not extend along the axial length of the photo-multiplier tube, variances in the gap dimension in one location will not affect the dynamics of the system in another location. Each support ring 102 acts independently of other support rings 102.

It should be recognized that there are alternative methods of applying the compound coupler and support rings to a scintillation element. For example, one method is to use wraps of teflon and steel between the scintillation reflector 67 and the support rings 102. The scintillation element 50 is wrapped with teflon tape to about 0.03 inches, uncompressed, or with approximately 0.015 inches thick sheet of skived teflon to serve as a reflector. A thin layer of stainless steel, ideally 0.002 inches to 0.005 inches thick, is then wrapped around the teflon reflector, with the joint of the stainless steel wrap positioned on the opposite side of the scintillation element 50 from the joint of the skived teflon sheet. The inside surface of the steel wrap can be coated white, or with a reflective material to provide additional reflection of any light that may pass through the teflon reflector. Support rings 102 are then placed around this assembly with tape or bonded material to hold the rings in place, similar to the way elements 106 in FIG. 8 are used in the embodiment described earlier.

Another method is to wrap the reflector 67, which is around the scintillation element 50, with two layers of stainless steel, the inside surface of the inside layer of stainless steel being coated with a reflecting material. The two layers of stainless steel would be separated by an elastomeric material that is molded or bonded, in the form of ridges or strips, to the surface of one of the layers (similar to the ridges of sheath 81 in FIG. 3). This approach is low cost and reduces the compression forces due to the expansion of the scintillation element 50 during temperature changes so that the support rings 102 may be a stiffer configuration to make installation simpler.

Figure 9:
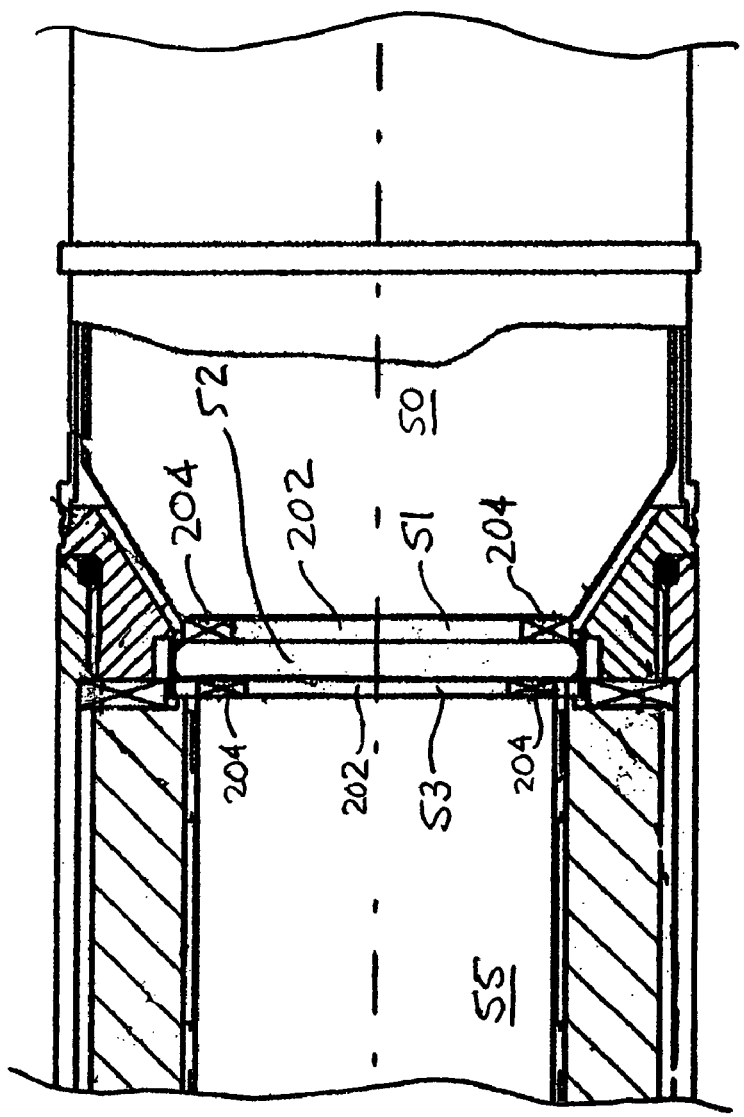
FIG. 9 is a cross-sectional view of an optical coupler constructed in accordance with an embodiment of the invention.

The compound optical coupler of the invention will now described with reference to FIG. 9, which shows in greater detail the first optical coupler 51, the window 52 and the optical coupler 53 of FIG. 2. The invention provides a compound optical coupler that transmits light pulses from a scintillation element 50 into the light detector device (e.g., photomultiplier tube 55). To accomplish this, the invention includes a self-wetting clear optical coupling gel 202, which can be Wacker, for example, and a special elastomeric load ring 204, which can be Sylgard, for example. Alternatively, the load ring 204 can comprise another rubber-type material.

The elastomeric load ring 204 is molded or otherwise attached to the face of the photomultiplier tube 55 and the window unit 52 to form an annular ring with an outer diameter that is preferably the same as that of photomultiplier tube 55. The inner diameter of the load ring 204 is sized based on the forces that it must withstand. A self-wetting optical material is then poured into the inner diameter of the load ring 204, forming a slightly convex surface. The convex surface allows for good contact with the self-wetting coupler material prior to engaging the elastomeric load ring 204, thus providing a good optical interface.

The drawbacks associated with previous attempts to use a self-wetting clear material in an optical coupler are circumvented by the present invention which uses an elastomeric load ring 204. The elastomeric load ring 204 made from an elastomeric material can be bonded, or otherwise attached to the light detector device (e.g., photomultiplier tube 55) or to a window of a scintillation element 50 as an annular ring outside the primary light paths. The elastomeric load ring 204 serves as: (1) the primary load path to maintain the interface forces between the scintillation element 50 and the light detector device; and (2) as a retainer ring to prevent migration of the soft self-wetting clear material 202 from the interface. The result is an interface between the scintillation element 50 and light detector device that is self-healing, is pliable enough to maintain a clear bubble-free interface under extreme loads and vibration, and is more tolerant of fabrication and/or assembly tolerances.

While the invention has been described in detail in connection with preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention.

What is claimed is:

1. A compound optical coupling assembly comprising:
   a self-wetting optical coupling gel in an interior portion of a compound optical coupling assembly; and
   an elastomeric load ring radially outward of said self-wetting optical coupling gel, wherein said self-wetting optical coupling gel is in an inner portion of said elastomeric load ring.

2. The compound optical coupling assembly of claim 1, wherein said self-wetting optical gel comprises Wacker or like material.

3. The compound optical coupling assembly of claim 1, wherein said elastomeric load ring comprises Sylgard or like material.

4. The compound optical coupling assembly of claim 1, wherein said elastomeric load ring is bonded to a light detector device.

5. The optical coupling assembly of claim 1, wherein said elastomeric load ring is bonded to a scintillation element.

6. The optical coupling assembly of claim 1, wherein said elastomeric load ring is bonded to a window of a scintillation housing.

7. An optical coupling assembly comprising:
   a self-wetting optical coupling gel in said coupling assembly; and
   an elastomeric support device radially outward of said self-wetting optical coupling gel, wherein said self-wetting optical coupling gel is in an inner portion of said elastomeric load ring.

8. The optical coupling assembly of claim 7, wherein said self-wetting optical gel comprises Wacker or like material.

9. The optical coupling assembly of claim 7, wherein said elastomeric support device comprises Sylgard or like material.

10. The optical coupling assembly of claim 7, wherein said elastomeric support device is attached to a light detector device.

11. The optical coupling assembly of claim 7, wherein said elastomeric support device is attached to a scintillation element.

12. The optical coupling assembly of claim 7, wherein said elastomeric support device is attached to a window of a scintillation housing.

13. An optical coupling assembly comprising:
    a self-wetting optical coupling gel; and
    an elastomeric support device radially outward of said self-wetting optical coupling gel, wherein said self-wetting optical coupling gel has a slightly convex surface.

14. The optical coupling assembly of claim 13, wherein said self-wetting optical gel comprises Wacker or like material.

15. The optical coupling assembly of claim 13, wherein said elastomeric support device comprises Sylgard or like material.

16. The optical coupling assembly of claim 13, wherein said elastomeric support device is attached to a light detector device.

17. The optical coupling assembly of claim 13, wherein said elastomeric support device is attached to a scintillation element.

18. The optical coupling assembly of claim 13, wherein said elastomeric support device is attached to a window of a scintillation housing.

* * * * *

UNITED STATES PATENT AND TRADEMARK OFFICE
CERTIFICATE OF CORRECTION

PATENT NO. : 7,115,873 B2 Page 1 of 1
APPLICATION NO. : 10/911485
DATED : October 3, 2006
INVENTOR(S) : Dwight Medley et al.

It is certified that error appears in the above-identified patent and that said Letters Patent is hereby corrected as shown below:

On the title page, item (75): add --Larry D. Frederick, Huntsville, AL (US)--

Signed and Sealed this

Twenty-fourth Day of April, 2007

JON W. DUDAS
*Director of the United States Patent and Trademark Office*